(12) United States Patent
Kim et al.

(10) Patent No.: US 9,414,025 B2
(45) Date of Patent: Aug. 9, 2016

(54) METHOD FOR INTELLIGENTLY DISPLAYING SPORTS GAME VIDEO FOR MULTIMEDIA MOBILE TERMINAL

(75) Inventors: Changick Kim, Daejeon (KR); Keewon Seo, Seoul (KR); Yong-Man Ro, Daejeon (KR); Min-Soo Hahn, Daejeon (KR)

(73) Assignee: Korea Advanced Institute of Science and Technology, Guseong-Dong, Yuseong-Gu, Daejeon (KR)

( * ) Notice: Subject to any disclaimer, the term of this patent is extended or adjusted under 35 U.S.C. 154(b) by 1105 days.

(21) Appl. No.: 13/420,955

(22) Filed: Mar. 15, 2012

(65) Prior Publication Data

US 2012/0224748 A1  Sep. 6, 2012

Related U.S. Application Data

(63) Continuation of application No. 11/528,114, filed on Sep. 27, 2006, now Pat. No. 8,164,630.

(30) Foreign Application Priority Data

Mar. 30, 2006 (KR) .................. 10-2006-0028802

(51) Int. Cl.
*H04N 7/18* (2006.01)
*G06T 3/40* (2006.01)
*G06T 7/00* (2006.01)

(52) U.S. Cl.
CPC ............... *H04N 7/18* (2013.01); *G06T 3/4092* (2013.01); *G06T 7/0083* (2013.01); *G06T 2207/10016* (2013.01); *G06T 2207/20004* (2013.01); *G06T 2207/20132* (2013.01); *G06T 2207/30224* (2013.01)

(58) Field of Classification Search
CPC .................. H04N 19/00406; H04N 19/00387; H04N 19/0066; H04N 19/0029; H04N 19/00248
USPC .......................... 375/240.01–240.29; 348/157
See application file for complete search history.

(56) References Cited

U.S. PATENT DOCUMENTS

2007/0121011 A1* 5/2007 Relan et al. ................... 348/571
2007/0242088 A1* 10/2007 Kim et al. ..................... 345/660

FOREIGN PATENT DOCUMENTS

| JP | 8-249450 A | 9/1996 |
|---|---|---|
| JP | 2002-168636 A | 6/2002 |
| KR | 08-249450 A | 9/1996 |
| KR | 10-1999-0033641 A | 5/1999 |
| KR | 10-2001-0088453 A | 9/2001 |
| KR | 10-2002-168636 A | 6/2002 |
| KR | 10-2003-0080283 A | 10/2003 |
| KR | 10-2004-0079804 A | 9/2004 |

* cited by examiner

*Primary Examiner* — Andy Rao
(74) *Attorney, Agent, or Firm* — Cha & Reiter, LLC.

(57) ABSTRACT

Disclosed is a method for intelligently displaying a sports game video for a multimedia mobile terminal, the method including the steps of: determining if a camera shot existing in the sports game video is a long-shot; when the camera shot is determined as a long-shot, determining a ROI within an image frame of the sports game video; and when the camera shot is determined as a non-long-shot, displaying the image frame on the mobile terminal, and, when the camera shot is determined as a long-shot, enlarging and displaying the ROI on the mobile terminal.

11 Claims, 9 Drawing Sheets

METHOD FOR INTELLIGENTLY DISPLAYING SPORTS GAME VIDEO FOR MULTIMEDIA MOBILE TERMINAL

CROSS REFERENCE TO RELATED APPLICATIONS

This is a Continuation of U.S. application Ser. No. 11/528,114 filed on Sep. 27, 2006, which claims priority to an earlier application entitled "Method For Intelligently Displaying Sports Game Video For Multimedia Mobile Terminal," filed in the Korean Intellectual Property Office on Mar. 30, 2006 and assigned Serial No. 2006-28802, all of which are hereby incorporated by reference.

BACKGROUND OF THE INVENTION

1. Field of the Invention

The present invention relates to a display method for a multimedia mobile terminal, and more particularly to a method for intelligently displaying a sports game video which enables a non-long-shot is to be displayed through an entire frame thereof, but a long-shot is to be displayed through an enlargement of only a Region Of Interest (ROI) existing therein, so that the long-shot includes objects are seen in a smaller scale.

2. Description of the Related Art

With the recent and rapid development of multimedia signal processing and transmission technology and the appearance of new types of mobile TV service including a Digital Video Broadcasting-Handheld (DVB)-H and Digital Multimedia Broadcasting (DMB), etc., the frequency of users watching videos through a small LCD panel is increasing. FIG. 1 is a diagram illustrating a state in which a DMB phone receives and outputs soccer game broadcasting. However, most services are simply provided in an existing screen size.

According to an experiment carried out by Knoche, etc., in order to measure conditions such as the number of pixels and a bit rate of an image suitable for displaying a reduced image on a mobile terminal (as published in "H. Knoche, J. D. McCarthy, and M. A. Sasse, Can small be beautiful?: assessing image resolution requirements for mobile TV, in MULTIMEDIA '05: Proceeding of the 13th annual ACM international conference on Multimedia, pp. 829-838, ACM Press, (New York, N.Y., USA), 2005"), it can be understood that a direct reduction of an image for display in a small terminal may cause loss of details. Such loss increases significantly when the content of an image is a field sport, particularly, a soccer video, which is reduced in a sequence of a music video, news and a cartoon video. Thus, it is desirable to develop intelligent display technology capable of allowing viewers of a small mobile terminal to view a screen including only an enlarged ROI. The ROI may be defined as a region in which users take a great interest on a screen or a region to which users pay much more attention than any other regions. As designation of the ROI may be a first step for meaningfully analyzing a video scene, it is important technology in the field of image analysis.

FIG. 2 is a diagram illustrating three types of shots existing in a sports game video. In FIG. 2, (a) indicates a long-shot, (b) indicates a medium-shot and (c) indicates a close-up shot. In long-shot (a), it is necessary to extract, enlarge and reproduce an ROI.

Various methods have been researched in order to determine an ROI. According to "L.ltti, C. Koch, and E. Niebur, A model of saliency-based visual attention for rapid scene analysis, IEEE Transactions on Pattern Analysis and Machine Intelligence, vol. 20. no. 11, pp. 1254-1259, November 1998.", a visual attention model capable of expressing multiple spatial and visual features on one saliency map has been proposed in order to find out visually salient portions, but expansion to a moving picture has not been sufficiently considered.

According to "W.-H. Cheng, W.-T. Chu, and J.-L. Wu, A visual attention based region-of-interest determination framework for video sequences, IEICE Transactions on Information and Systems, E-88D, pp. 1578-1586, 2005.", ROI determination in video has been researched based on brightness and darkness, color tone and motion information. In this research, they have proposed a method for indicating a most salient feature point in each image frame of video on an assumption that an important object has a high contrast in color tone or brightness and darkness. However, this assumption is not always correct because an important object may be dark or have a low contrast.

For video skimming and summary, according to "Y.-F. Ma and H.-J. Zhang, A model of motion attention for video skimming, in Proc, ICIP, pp, 129-132, 2002.", a user's interest model has been proposed using motion, speech, camera operation, video edition information, etc., based on another video analysis method.

As described above, the methods for extracting ROIs by using considerable features within a video screen have proposed. However, a field sports video such as a soccer game includes both a shot requiring an extraction of an ROI and a shot not requiring the extraction of the ROI. In the former, small objects having considerable features simultaneously may exist within a screen. In this case, since multiple ROIs may exist, it is not suitable for intelligent display for a mobile terminal, which partially extracts the portions of a screen, then enlarges and displays the extracted portions.

SUMMARY OF THE INVENTION

Accordingly, the present invention has been made to solve the above-mentioned problems occurring in the prior art and provides additional advantages, by providing a solution, in which, when a sports game video is displayed on a mobile terminal, a non-long-shot is displayed through an entire frame thereof, and a long-shot is displayed through the enlargement of only a ROI existing therein, so that viewers can more easily understand the video enjoy the video.

In accordance with one aspect of the present invention, there is provided a method for intelligently displaying a sports game video for a multimedia mobile terminal, the method including the steps of: determining if a camera shot existing in the sports game video is a long-shot; when the camera shot is determined as a long-shot, determining a ROI within an image frame of the sports game video; and when the camera shot is determined as a non-long-shot, displaying the image frame on the mobile terminal, and, when the camera shot is determined as a long-shot, enlarging and displaying the ROI on the mobile terminal.

BRIEF DESCRIPTION OF THE DRAWINGS

The above features and advantages of the present invention will be more apparent from the following detailed description taken in conjunction with the accompanying drawings, in which.

DETAILED DESCRIPTION OF THE INVENTION

An embodiment of the present invention will be described in detail herein below with reference to the accompanying drawings. For the purposes of clarity and simplicity, a detailed description of known functions and configurations incorporated herein will be omitted as it may obscure the subject matter of the present invention. In the following embodiment, a process for displaying a soccer game video from among sports game videos will be described as an example, but it should be noted that other video activity relating to other fields can be applied according to the teachings of the present invention.

First, a video may be defined as a sequence of shots as expressed by equation 1 below. The shot refers to an image sequence obtained through one-time camera recording process.

$$\text{Video} = <\text{Shot}_0, \ldots, \text{Shot}_{K-1}>, (K \text{ is the number of video frames}) \quad \text{Equation 1}$$

The shot may be expressed by a series of frames in equation 2 below.

$$\text{Shot}_K = <f_k^0, \ldots, f_k^{N-1}> \quad \text{Equation 2}$$

In equation 2, $f_k^i$ represents the $i^{th}$ frame of $\text{Shot}_k$ and N represents the number of frames in a shot. Hereinafter, the $i^{th}$ frame will be expressed by $f^i$ throughout the video. The ROI of the $i^{th}$ frame of a $k^{th}$ shot may be expressed by $\text{ROI}(f_k^i)$. Further, the ROI may also be the whole or a part of an image frame depending on the type of a shot. That is, this may be expressed by equation 3 below.

$$\text{ROI}(f_k^i) \subset f_k^i, \text{ if Class}(\text{Shot}_k) \text{ is a long-shot}$$

$$\text{ROI}(f_k^i) = f_k^i, \text{ if Class}(\text{Shot}_k) \text{ is not a long-shot} \quad \text{Equation 3}$$

The above means that a ROI takes a small portion in a frame for a long-shot case, whereas the ROI is determined identical to the original image frame otherwise.

Figure 1:
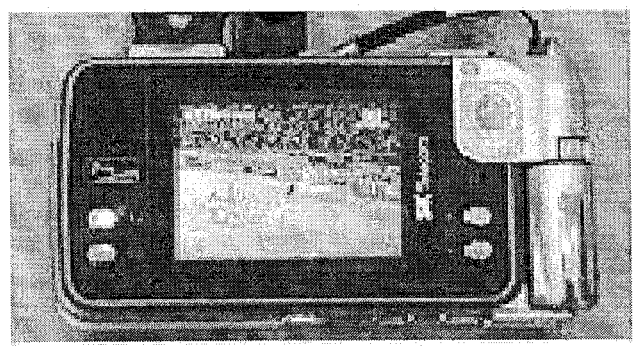
FIG. 1 is a diagram illustrating a DMB phone receiving and outputting soccer game broadcasting.
Figure 2A:
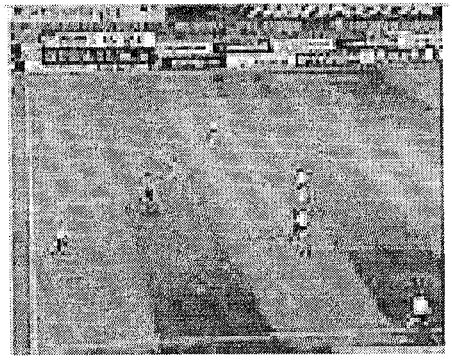
FIG. 2 is a diagram illustrating three types of shots (long-shot, medium-shot and close-up shot) existing in a sports game video.
Figure 2B:
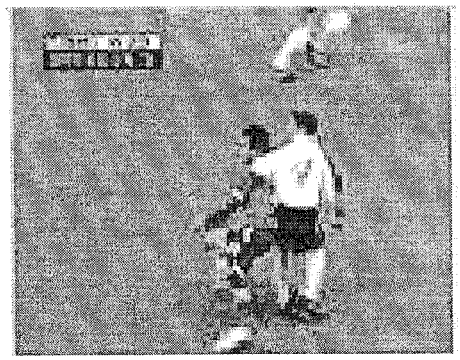
Figure 2C:
Figure 3:
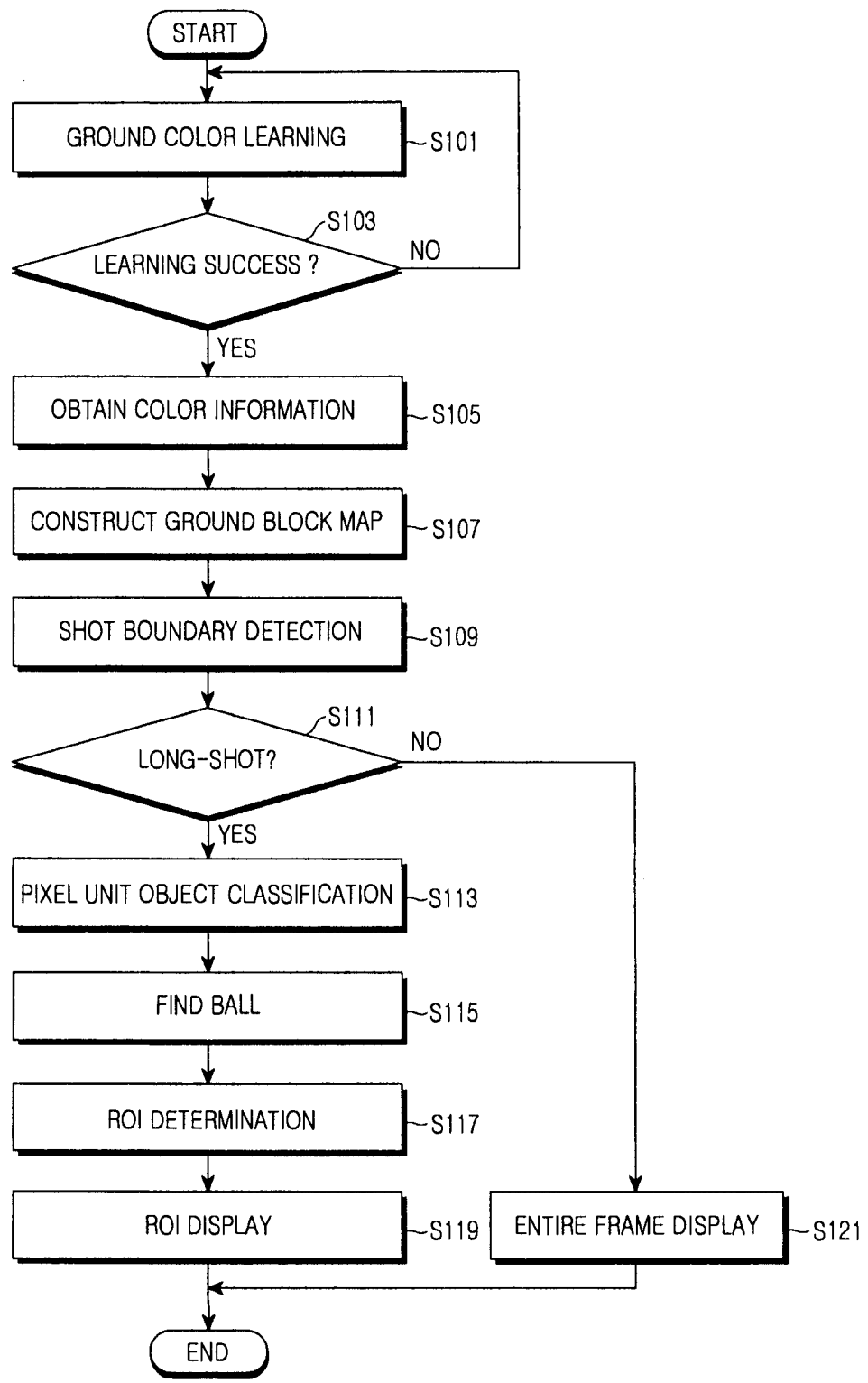
FIG. 3 is a flow diagram illustrating an intelligent display method in a sports game video according to one embodiment of the present invention.

FIG. 3 is a flow diagram illustrating an intelligent display method in a sports game video according to one embodiment of the present invention.

Referring to FIG. 3, the intelligent display method of the present invention includes a first process S101, S103, S105, S107, S109 and S111, a second process S113, S115 and S117, and a third process S119 and S121. Briefly, in the first process, whether a camera shot existing in a sports game video is a long-shot is determined. In the second process, a ROI is determined within the image frame of the sports game video when the camera shot is a long-shot. In the third process, the entire image frame is displayed on a mobile terminal when the camera shot is a non-long-shot, and the ROI is enlarged and displayed on the mobile terminal when the camera shot is a long-shot.

In details, the first process includes steps 101, 103 and 105 for learning a ground color in the sports game video, and steps 107, 109 and 111 for extracting the ground color learned from the image frame and determining a long-shot or a non-long-shot according to comparison results with a preset reference value.

In step 107, the image frame is divided into (n×n) blocks to construct a ground block map. In step 109, temporal block difference of the ground block map is checked to detect a shot boundary, and a segment having the longest ground color is found from each column of the ground block map within the detected shot boundary. In step 111, a segment existing within a gold region of the image frame and having the longest ground color is compared with the preset reference value, and a long-shot or a non-long-shot is determined. A detailed process of steps 101-109 will be explained later.

The second process includes steps 113 and 115 for finding the location of a ball in the image frame, and step 117 for computing a distance between the location of the ball found in steps 113 and 115 and a previous display window, primarily determining the location of the ROI based on the location of the ball, and finally determining the location of the ROI by changing the primarily determined location based on the computed distance.

In steps 113 and 115, a binary image is constructed on a pixel basis with respect to the image frame, a connected component labeling of eight directions is performed for the binary image so as to obtain lists of each object according to the attributes of each object, a ball candidate list of the obtained lists is maintained, objects classified as a ball among newly found objects are added to the ball candidate list, and the location of an object shifted to a ball candidate in several frames is determined as the location of a ball in the ball candidate list.

Hereinafter, the intelligent display process of the sports game video for a multimedia mobile terminal according to the present invention will be described in detail on a step-by-step basis.

S101, S103 and S105: Ground Color Learning Step

Figure 4A:
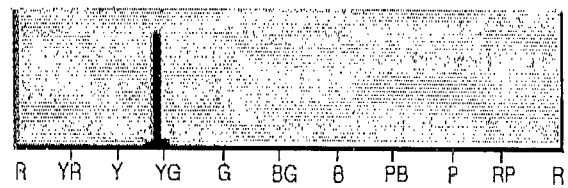
FIG. 4 is a diagram illustrating a histogram on a channel-by-channel basis in an HSV color space for a long-shot image in a sports game video according to the present invention.
Figure 4B:
Figure 4C:
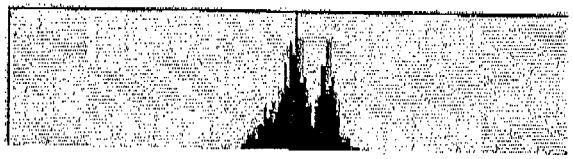

The color of the ground is important in the analysis of a soccer video. Particularly, this is important to determine the type of a shot. In the present invention, the amount of pixels expressing a ground color is an important clue for determining the types of a shot. It is necessary to learn a ground color of a video sequence in the first step of a system because the ground color slightly changes depending on the video sequence (S101). FIG. 4 is an HSV histogram obtained from a long-shot of a general soccer video. In particular, FIGS. 4a, 4b, and 4c indicate hue, saturation and value (brightness), respectively. As it can be understood from FIG. 4, hue values have been especially focused on the regions of yellow-green. However, saturation and value change depending on videos. On account of this, the present invention implements the following ground color learning method.

First, 64 bins are allocated to hue and saturation channels and 256 bins are allocated to a value channel. Hereinafter, the number of bins in the hue channel, the saturation channel and the value channel will be referred to as an NH, an NS and an NV, respectively. Accordingly, an HSV histogram for an $i^{th}$ frame may be defined by equation 4 below.

$$Hue_i[k]: 0 \leq k < NH$$

$$Saturation_i[k]: 0 \leq k < NS$$

$$Value_i[k]: 0 \leq k < NV \qquad \text{Equation 4}$$

The HSV histogram is accumulated and used over the first 30 frames of the video. Hereinafter, this will be referred to as a HUE, a SATURATION and a VALUE and may be defined by equation 5 below. Of course, the number of frames over which the HSV histogram is accumulated may be changed without limit because it is a set value.

$$HUE[k] = \sum_{i=0}^{29} Hue_i[k] \qquad \text{Equation 5}$$

$$SATURATION[k] = \sum_{i=0}^{29} Saturation_i[k]$$

$$VALUE[k] = \sum_{i=0}^{29} Value_i[k]$$

For the definition above, the present invention defines the following two values expressed by equations 6 and 7 below.

$$ValuePeakIndex = i, \text{ where } VALUE[k] \geq VALUE[p] \text{ for all } 0 \leq p \leq NV, \text{ and} \qquad \text{Equation 6}$$

$$\text{Saturation Mean} = \frac{\sum_{i=0}^{NS-1} i \cdot SATURATION[i]}{\sum_{i=0}^{NS-1} SATURATION[i]} \qquad \text{Equation 7}$$

In equation 6, ValuePeakIndex denotes the index of a bin having a peak value of a value histogram. In the present invention, when the condition of equation 8 below is satisfied, it is determined that the learning of a ground color has been successfully performed (S103).

$$0.7 \times \text{frame, width} \times \text{frame, height} \times 30 < \sum_{i=9}^{21} HUE[i] \qquad \text{Equation 8}$$

That is, if a sum of HUE[i] exceeds 70% of the number of pixels corresponding to an entire frame within the range of $9 \leq i \leq 21$, it is determined that the learning has been normally performed. The ground color within the distribution of hue values has a range of 9 to 21 as a result of observing several soccer videos. However, if this condition is not satisfied, it is regarded that the learning has failed and the same operation is performed again over the subsequent 30 frames. Of course, since both the range of the ground color within the distribution of hue values and a reference value 70%, which is used for determining if the learning of the ground color has been normally performed, are only preset values, they may be changed without limit.

As a result of observing many soccer games, it can be understood that a correlation of g>r>b is generally established in the ground color. Herein, in order to prevent a ball or the pixels of gray from being erroneously determined as a ground, extra conditions are added. A method for changing the RGB values of a certain color into HSV values so as to compute saturation S and value V may use equation 9 below as proposed in "J. D. Foley, A. vanDam, S. K. Feiner, J. F. Hughes, Computer Graphics—Principles and Practice, pp. 592, 593, Addison-Wesley, 1996".

$$S = \frac{\text{Max}(R, G, B) - \text{Min}(R, G, B)}{\text{Max}(R, G, B)} \quad (0.0 \leq S \leq 1.0) \qquad \text{Equation 9}$$

$$V = \text{Max}(R, G, B) \quad (0.0 \leq V \leq 1.0)$$

In equation 9, the R, G, B values have been normalized to be a value between 0 and 1.

The present invention has found the fact that the R, G, B values of most pixels corresponding to a ground has a correlation of g>r>b. When such a correlation of g>r>b and equation 9 are used, V may be expressed by g=G·NV because G≈Max(R,G,B) and NV=256. Further, $$S = \frac{g-b}{g} \cdot NS = \frac{G-B}{G} \cdot NS.$$

This is because G≈Max(R,G,B) and B≈Min(R,G,B). In short, an equation for determining if each pixel belongs to a ground in a rgb color space may be expressed by equation 10 below.

$$\text{Ground}(x, y) = \begin{cases} 1 & \text{if} \begin{cases} g > 0.95 \cdot r \text{ and} \\ r > 0.95 \cdot b \text{ and} \\ g < ValuePeakIndex + \theta_1 \text{ and} \\ \frac{g-b}{g} \cdot NS > SaturationMean - \theta_2 \end{cases} \\ 0 & \text{otherwise} \end{cases} \qquad \text{Equation 10}$$

In equation 10, r, g, b have values of 0 to 255 as RGB values in (x, y), and $\theta_1$ and $\theta_2$ have been set to NV/6 and NS/4, respectively. When the Value of a pixel has a value much higher than the ValuePeakIndex and the Saturation is much lower than the Saturationmean, it is determined that the pixel does not belong to a ground.

Figure 5A:
FIG. 5 is a diagram illustrating a ground color identification process according to a method proposed by the present invention.
Figure 5B:
Figure 5C:
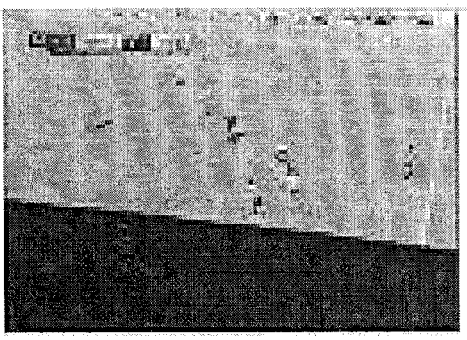
Figure 5D:

This method has a fast determination speed and is normally performed even when a shadow partially looms on a ground as illustrated in FIGS. 5a and 5c. Accordingly, it is possible to obtain color information capable of identifying ground colors as expressed by a black color in FIGS. 5b and d (S105).

S107: Ground Block Map Construction Step

In the present invention as described above, it is possible to determine if each pixel belongs to a ground. For rapid shot boundary detection and shot identification, an entire frame is divided into (16×16) blocks to generate a ground block map GB (i, j). In order to define the ground block map GB (i, j), a set $B_{ij}$ of pixels within one block may be defined as expressed by equation 11 below.

$$B_{ij} = \{(x,y) | i \times 16 \leq x < (i+1) \times 16, j \times 16 \leq y < (j+1) \times 16\} \qquad \text{Equation 11}$$

Then, the ground block map GB (i, j) is defined using equation 11 as expressed by equation 12 below.

$$GB(i, j) = \begin{cases} 1 \text{ (Ground)} & \text{if } \dfrac{\sum_{(x,y) \in B_{ij}} \text{Ground}(x, y)}{16 \times 16} \geq 0.2 \\ 0 \text{ (Object)} & \text{otherwise} \end{cases} \quad \text{Equation 12}$$

This denotes that, if more than 20% of pixels within one block show a ground color, the block is regarded as a ground. In the present invention, the ground block map of a frame will be expressed by GB (i, j) in the subsequent process. Of course, 20%, which is a reference value for determining the ground color, may be changed without limit because it is a set value.

S109: Shot Boundary Detection Step

Shot boundary detection is a basic process of video analysis. This is because the amount of calculation can be reduced by classifying shots only in a shot boundary and the accuracy of shot type determination can be improved by reducing the error of determination due to temporary change in a screen state. In the present invention, the Temporal Block Difference (TBD) of the ground block map is checked so as to detect a shot boundary efficiently and quickly.

$$TBD_i = \sum_x \sum_y \{GB_{i-3}(x, y) \otimes GB_i(x, y)\} \quad \text{Equation 13}$$

In equation 13, $\otimes$ denotes an XOR operation. In the present invention, when $TBD_{i-1} < \theta_{shortChange}$ and $TBD_i \geq \theta_{ShortChange}$, i is designated as the shot boundary ($\theta_{ShortChange} = 30$). In a scene changing rapidly, a situation of $TBD_i \geq \theta_{ShortChange}$ frequently occurs. Accordingly, a condition of $TBD_{i-1} < \theta_{ShortChange}$ is added so as to reduce a boundary detection error. Further, a current ground block map is compared with a ground block map before three frames. This is for coping with a case in which a shot gradually changes due to paid-in/out or visual effect.

S111: Shot Type Determination Step

Figure 6A:
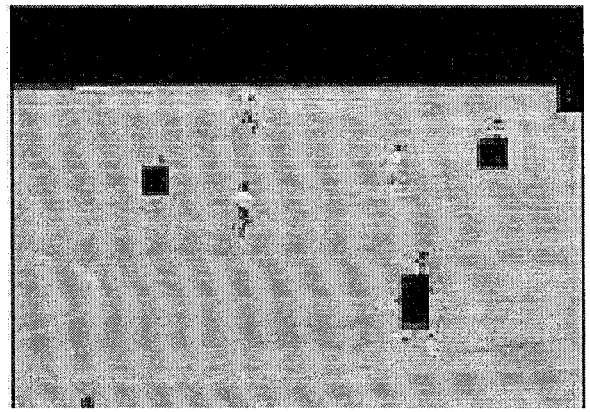
FIG. 6 is a diagram illustrating an image after small holes existing in a ground block map are filled according to the present invention.
Figure 6B:
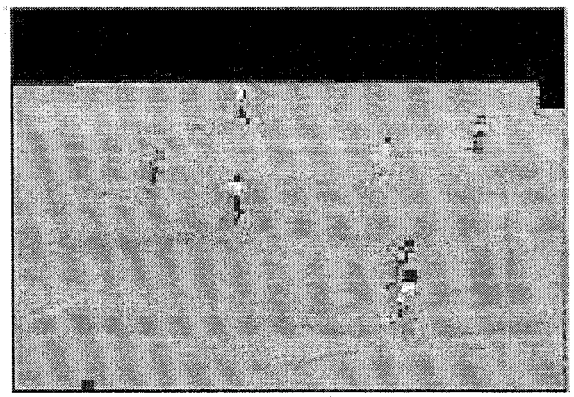

If the shot boundary is detected, shot type determination must be performed at the point at which the shot boundary is detected. In order to identify a long-shot and a non-long-shot, the present invention uses the ground block map. In the first step, holes occurring in a ground by soccer players as illustrated in FIG. 6a must be filled as illustrated in FIG. 6b. Details will be described as follows.

$$GB(i, j) = 1 \text{ if} \begin{cases} [GB(i-1, j) = 1 \text{ and } \{GB(i+1, j) = 1 \text{ or} \\ \quad GB(i+2, j) = 1\}] \text{ or} \\ [GB(i-2, j) = 1 \text{ and } \{GB(i-1, j) = 1 \text{ or} \\ \quad GB(i+1, j) = 1\}] \end{cases} \quad \text{Equation 14}$$

This denotes that, when holes corresponding to the height of one or two blocks exist in a vertical direction, the holes are filled.

Figure 7A:
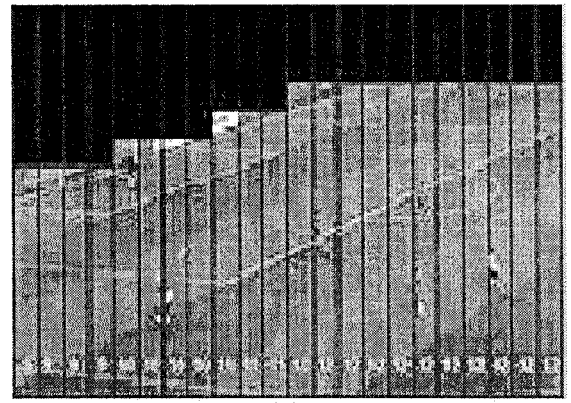
FIG. 7 is a diagram illustrating a method for determining a long-shot or a non-long-shot by using a Longest Green Segment (LGS) in a sports game video processing process according to the present invention.
Figure 7B:
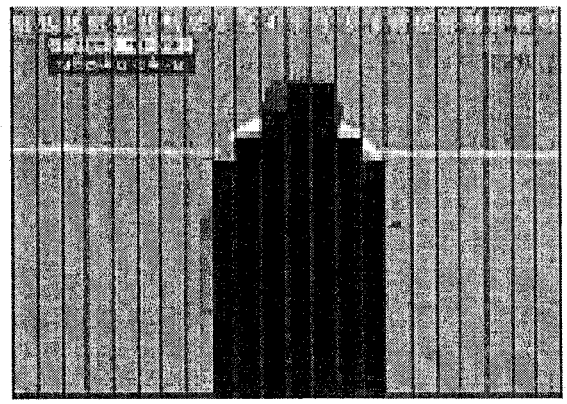

After the holes are filled, the Longest Green Segment ($LGS_k$) is found with respect to each column k of the ground block map. The $LGS_k$ can be obtained by comparing length values of LGSs expressed in each column of FIGS. 7a and 7b. Then, the length of the LGS within a gold region (a central region corresponding to 5 when an image is divided by 3:5:3 in a horizontal direction) is measured, so that the type of a shot can be determined. As illustrated in FIG. 7, if only one LGS smaller than $\theta_L$ exists, it is determined that a corresponding shot is not a long-shot. That is, it is determined that the shot of FIG. 7a is a long-shot and the shot of FIG. 7b is not a long-shot.

$$\text{Class}(f) = \begin{cases} \text{Non-long-shot}, & \text{if } |LGS_k| < \theta_L \\ \text{long-shot}, & \text{otherwise} \end{cases} \quad \text{Equation 15}$$

for $GSLeft \leq k \leq GSRight$

In equation 15, $\theta_L$ is set to have a value of BlocksInColumn/3, GSLeft is set to have a value of BlocksInRow×3/11, and GSRight is set to have a value of BlocksInRow×8/11.

S113: Pixel Unit Object Classification Step

If the shot type determination ends, each frame is classified as a long-shot and a non-long-shot by equation 12. In the case of a non-long-shot, it is not necessary to set a ROI smaller than an entire image frame. This is because display (S121) of an entire frame is sufficient for the user. However, in the case of a long-shot, it is necessary to set a ROI and then enlarge and reproduce the set ROI. In the present invention, it is assumed that viewers are much more interest in situations around a ball, and information about the current and past positions of the ball is most importantly handled in designating a ROI. In order to find the ball, the binary image is constructed on a pixel basis by using the Ground (x, y) of equation 10.

$$\text{BinaryMap}(x, y) = \begin{cases} 0 & \text{if Ground } (x, y) = 1 \\ 1 & \text{otherwise} \end{cases} \quad \text{Equation 16}$$

Figure 8A:
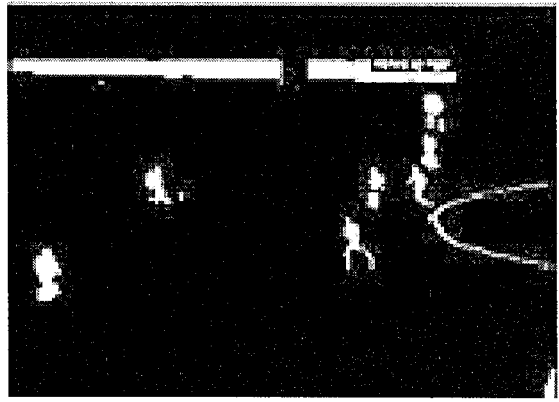
FIG. 8 is a diagram illustrating a sports game video processing process according to the present invention.
Figure 8B:
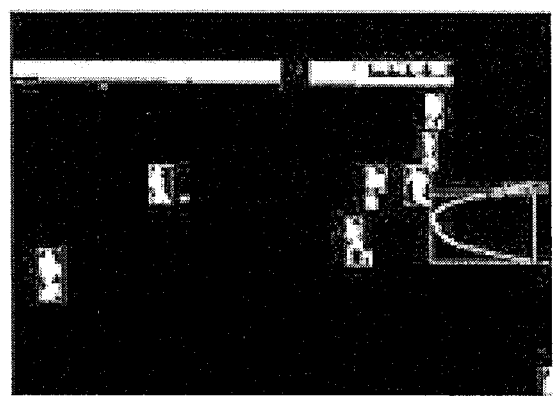

Through this process, it is possible to obtain the image as illustrated in FIG. 8a. A connected component labeling of eight directions is performed for this image, so that a list of objects within the ground can be obtained. In FIG. 8b, Minimum Bounding Rectangles (MBRs) of the obtained objects are expressed by a yellow color. The objects are classified as a ball, a soccer player, a small object similar to a ball, and other objects according to the attributes (e.g. an aspect ratio, average brightness, the number of component pixels, etc.) of the objects.

S115: Ball-Finding Step

The list of objects is obtained, but it is not easy to determine which object corresponds to a true ball only by the information of one frame. This is because socks or shoes of soccer players or lines exist in the ground, which may be misrecognized as a ball. In addition, a ball may be hidden by soccer players or distorted due to fast speed during a game. In several frames, the ball may not exist therein. Up to now, various research into tracking a ball have been conducted. In the method proposed in "Y. Seo, S. Choi, H. Kim and K. Hong, Where Are the Ball and Players? Soccer Game Analysis with Color Based Tracking and Image Mosaick, in ICIAP '97: Proceedings of the $9^{th}$ International Conference on Image Analysis and Processing-Volume ||, pp. 196-203, Springer-Verlag, London, UK, 1997.", the initial location of a ball must be manually designated. In the method proposed in "Y. Ohno, J. Miura and Y. Shirai, Tracking Players and a Ball in Soccer Games, in Int. Conf. On Multisensor Fusion and Integration for Intelligent Sys., Taipei, Taiwan, 1999.", soccer images photographed by a fixed camera are used. Thus, this method is not suitable for the present invention. In the method proposed in "X. Yu, C. Xu, H. W. Leong, Q. Tian, Q. Tang, K. Wan, Trajectory-Based Ball Detection and Tracking with Applications to Semantic Analysis of Broadcast Soccer Video, in MULTIMEDIA '03: Proceedings of the eleventh ACM international conference on Multimedia, pp. 11-20, ACM Press, (New York, N.Y., USA), 2003.", information about the subsequent frame is required to obtain the trajectory of a ball, and thus the method cannot be performed in realtime.

The present invention proposes a method capable of simply processing a broadcasting image in realtime, which is based on only previous values.

First, let us assume that a ball candidate tracked in the ground for the longest time period has a highest probability to be a ball. This can reduce temporary influence of noise. First, objects classified as balls among newly found objects are added to the current ball candidate list. The ball candidate is shifted to an object which is located adjacent to the ball candidate and has an attribute similar to that of the ball candidate. If the shifted object is a ball, the consecutive difference of the object increases. Otherwise, the consecutive difference of the object decreases. As a result, it is the most probable that an object having the highest consecutive difference corresponds to a ball. It is not necessary to track an object having a consecutive difference smaller than zero. Consequently, it is possible to correctly find a true ball with a high probability. When a ball does not actually exist in a soccer game video or a ball is not found because its shape is not normally identified, etc., the location of the most recently found ball is designated as the current location of a ball. When a ball is not found over three consecutive frames, the center of a screen is optionally designated as the location of a ball. It goes without saying that the three frames correspond to a reference value for optionally determining the location of a ball may be changed without limit because they are only a set value.

S117: ROI Determination Step (Designation of a ROI Window)

The simplest method for arranging a ROI window is to place the center of the ROI window in the location of a ball. However, when the center of the ROI follows the ball over several frames, it may be possible that a screen may be shaken or the screen may move too fast in the opinion of a user. In other words, considering the convenience of users utilizing a small display, the ROI window must move smoothly. Further, a method moving a display window in consideration of a case where a ball moves fast must include the concept of acceleration.

When a certain frame is determined as a long-shot in the shot type determination step, the center of the ROI window is initialized to be the location of a ball as expressed by equation 17 below.

$$window_i = lob_i \qquad \text{Equation 17}$$

$$disp_i = 0_i \qquad \text{Equation 18}$$

In equations 17 and 18, window, denotes the center of a display window in a frame $f^i$, $lob_i$ denotes the location of a ball in the frame $f^i$, and $disp_i$ denotes a displacement by which the ROI window must actually move in the frame $f^i$. When a long-shot successively appears, a difference between the location of a ball and a previous display window is computed and approach is implemented in a different way according to the computation result.

$$Diff = lob_i - window_{i-1} \qquad \text{Equation 19}$$

Although considering only a horizontal direction and a condition of diff≥0 for the sake of simple explanation, generality is not lost. In the present invention, the following three cases are considered (frame·width denotes the width of a frame).

Case 1: 0≤diff≤$disp_i$

Case 1 is a case in which a distance between the location of a ball and the center of the ROI window is shorter than a previous displacement. In this case, the location of the ROI window does not change. Instead, $disp_i$ is multiplied by a to obtain a reduced value of $disp_{i+1}$. These may be expressed by equations 20 and 21 below.

$$window_i = window_{i-1} \qquad \text{Equation 20}$$

$$disp_{i+1} = \alpha \cdot disp_i (0 < \alpha < 1) \qquad \text{Equation 21}$$

Case 2: $disp_i$ < diff ≤ frame·width/2

In case 2, the ROI window moves by $disp_i$, and then $disp_{i+1}$ is altered based on equation 23. Since |$disp_i$|>0, the ROI window does not easily move in a direction inverse to an existing direction.

$$window_i = window_{i-1} + disp_i \qquad \text{Equation 22}$$

$$disp_{i+1} = disp_i + \alpha_1 \cdot sign(diff) \qquad \text{Equation 23}$$

Case 3: frame·width/2 < diff

Case 3 is basically equal to case 2, but it has a larger acceleration parameter in order to cope with a case in which a ball moves too fast (0<$\alpha_1$<$\alpha_2$<1). These may be expressed by equations 24 and 25 below.

$$window_i = window_{i-1} + disp_i \qquad \text{Equation 24}$$

$$disp_{i+1} = disp_i + \alpha_2 \cdot sign(diff) \qquad \text{Equation 25}$$

Figure 9:
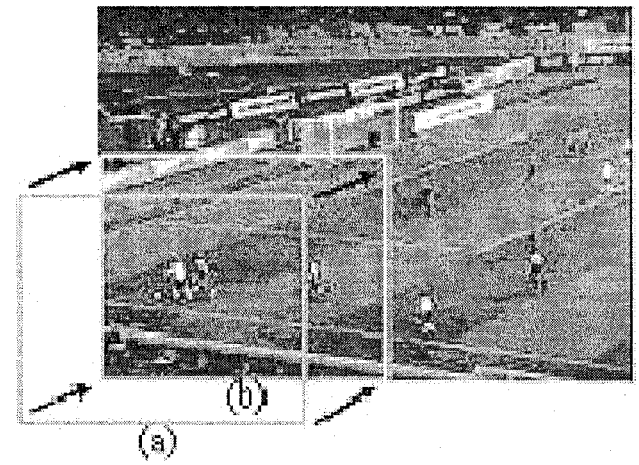
FIG. 9 is a diagram illustrating the location determination step of a ROI window in a sports game video processing process according to the present invention.
Figure 10:
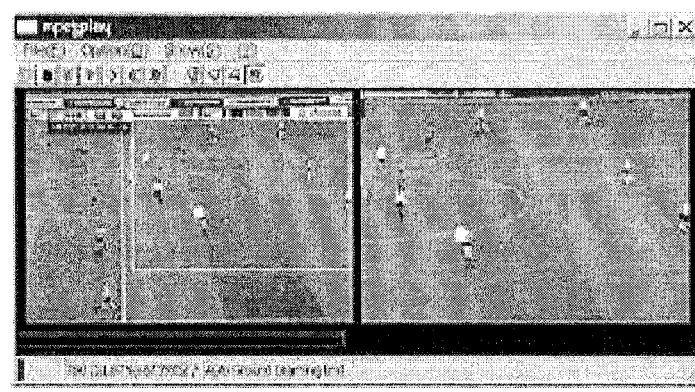
FIG. 10 is a diagram illustrating results of a sports game video processing process according to the present invention.

In this way, if the location of a display window is determined, the display window must be processed as illustrated in FIG. 9 and shown to a user. After the display window is determined as (a), but it deviates from a frame, the location of the display window is altered and the content of the frame must be shown to a user as illustrated in (b) (S119). In the above process, the used window, does not change.

As described above, the present invention uses technology including a method of learning a specific ground color from a given video and detecting a ground area, an automatic detection method of a shot requiring the extraction of a ROI, an automatic designation method of a ROI in a shot requiring the ROI, etc., precisely selects images, in which objects are seen as being small, from a sports game vide, and displays only a ROI existing in the images, thereby enabling viewers to easily understand the images and to efficiently view the images.

Although a preferred embodiment of the present invention has been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. A method for intelligently displaying a video for a multimedia mobile terminal, comprising the steps of:
   (a) determining whether a camera shot existing in the video is a long-shot or a non-long shot during displaying of the video;
   (b) determining a Region Of Interest (ROI) within an image frame of the video if the camera shot is determined as a long-shot in step (a); and
   (c) displaying the image frame on the mobile terminal as an original image frame without enlargement if the camera shot is determined as the non-long-shot in step (a), and displaying a portion of the original image frame by enlarging and displaying the ROI on the mobile terminal if the camera shot is determined as a long-shot in step (a) wherein step (a) comprises:

(a1) learning a ground color from the video; and (a2) extracting the ground color learned in step (a1) from the image frame, and determining the long-shot or the non-long-shot according to comparison results with a preset reference value.

2. The method as claimed in claim 1, wherein step (b) comprises:
   (b1) finding a location of a ball in the image frame;
   (b2) computing a distance between the location of the ball found in step (b1) and a previous display window; and
   (b3) primarily determining a location of the ROI based on the location of the ball found in step (b1), and finally determining the location of the ROI by changing the primarily determined location based on the distance computed in step (b2).

3. The method as claimed in claim 1, wherein, in step (c), if the ROI deviates from the image frame, a location of a display window is altered and a content of the image frame is enlarged and displayed.

4. The method as claimed in claim 1, wherein step (a2) comprises:
   (a21) dividing the image frame into (n×n) blocks to construct a ground block map;
   (a22) finding a segment having a longest ground color from each column of the ground block map; and
   (a23) comparing a length of the segment having the longest ground color existing in a center region of the image frame with the preset reference value, and determining a long-shot or a non-long-shot.

5. The method as claimed in claim 1, wherein, in step (a2), temporal block difference of the ground block map is checked to detect a shot boundary, and a long-shot or a non-long-shot is determined only in the detected shot boundary.

6. The method as claimed in claim 1, wherein, in step (b), the ROI is determined using both a location of a ball within the image frame and ROI location information of a previous frame.

7. The method as claimed in claim 1, wherein step (b) comprises:
   (b1) finding a location of a ball in the image frame;
   (b2) computing a distance between the location of the ball found in step (b1) and a previous display window; and
   (b3) primarily determining a location of the ROI based on the location of the ball found in step (b1), and finally determining the location of the ROI by changing the primarily determined location based on the distance computed in step (b2).

8. The method as claimed in claim 6, wherein, in step (b1), image division is performed for the image frame on a pixel basis so as to find the location of the ball.

9. The method as claimed in claim 7, wherein step (b1) comprises:
   (b11) constructing a binary image for the image frame on a pixel basis;
   (b12) performing a connected component labeling of eight directions for the binary image so as to obtain lists of each object according to attributes of said each object;
   (b13) maintaining a ball candidate list of the lists obtained in step (b12), adding objects classified as a ball among newly found objects to the ball candidate list; and
   (b14) determining a location of an object shifted to a ball candidate in several frames as the location of the ball in the ball candidate list.

10. The method as claimed in claim 7, wherein, in step (b1), if a ball is not consecutively found over a preset number of frames, a center of a screen is designated as the location of the ball.

11. The method as claimed in claim 1, wherein, in step (c), if the ROI deviates from the image frame, a location of a display window is altered and a content of the image frame is enlarged and displayed.

* * * * *